W. H. GREEN.
SETTLING TANK.
APPLICATION FILED JULY 12, 1919.
1,417,516.
Patented May 30, 1922.
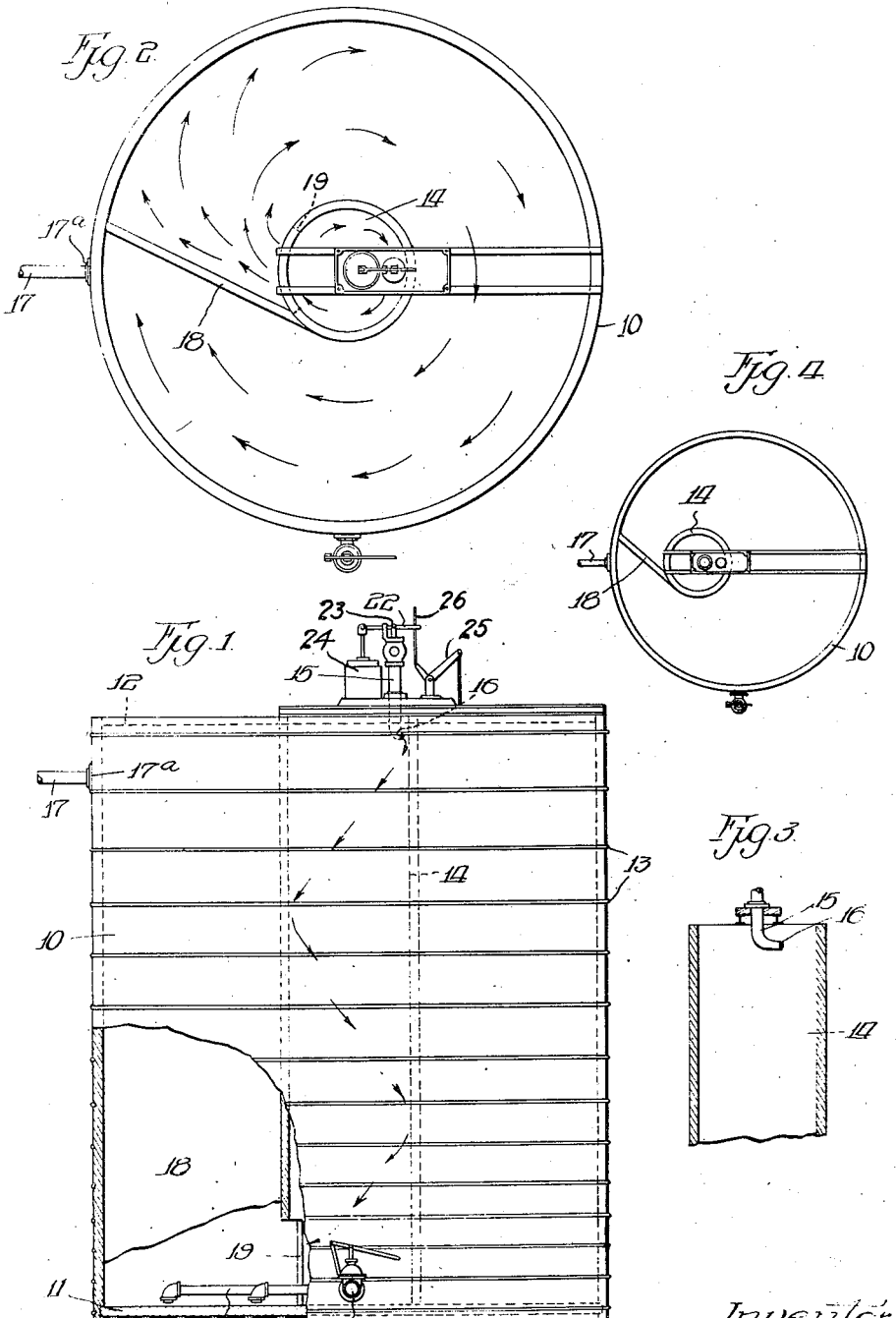
Inventor
Walter H. Green,

UNITED STATES PATENT OFFICE.

WALTER H. GREEN, OF CHICAGO, ILLINOIS, ASSIGNOR TO INTERNATIONAL FILTER CO., OF CHICAGO, ILLINOIS, A CORPORATION OF ILLINOIS.

SETTLING TANK.

1,417,516.      Specification of Letters Patent.      Patented May 30, 1922.

Application filed July 12, 1919. Serial No. 310,385.

*To all whom it may concern:*

Be it known that I, WALTER H. GREEN, a citizen of the United States, residing at Chicago, in the county of Cook and State of Illinois, have invented certain new and useful Improvements in Settling Tanks, of which the following is a specification.

In the construction of tanks or basins designed to allow precipitation of solids contained in fluids passing therethrough, it is conceded that efficiency is dependent, to a considerable extent, upon the length of travel made by the fluids through the basin, in other words, the longer successive portions of the flow are caused to remain within the basin, the greater the opportunity for the solids therein contained to gravitate.

This invention resides in the construction of a tank or basin wherein the flow is so directed and arrested as to require it to travel through a maximum of area before it reaches the discharge. Reference to the accompanying drawings for illustration and to the following specification for description will enable those skilled in the art to understand and practice the invention.

In the drawings—

Fig. 1 shows the tank in elevation with a section of the side wall broken away to illustrate internal details in vertical section;

Fig. 2 is a top plan view;

Fig. 3 a detail of the association between the inlet pipe and the inner chamber; and Fig. 4 a top plan view illustrating a modified positioning of the inner chamber.

The invention comprises a cylindrical tank 10, of either wood, metal or concrete, having a base 11, optionally a cover 12, and, when required, reinforcing hoops 13. An inlet pipe 15, through which the laden fluids are conducted to the tank, empties its contents near the top thereof. The outflow is carried off by a pipe 17 connected with the outlet 17ª which is also disposed adjacent the top of said tank.

Interposed between said inlet and outlet is a cylindrical chamber 14 and a dividing vertical plate or baffle 18, said chamber and baffle extending from the top to the bottom of said tank.

The inlet pipe 15 has its discharging end 16 bent and so disposed that the stream flowing therefrom is directed angularly against the inner periphery of chamber 14, thereby inducing a swirl to the body of fluid passing through said chamber.

An opening is provided in the lower end of said chamber at 19, by cutting away a portion of the wall thereof. The cross sectional area of said opening is at least equal to, and is preferably made greater than, that of the discharge end of inlet pipe 15, and in preferred form is rectangular.

The baffle 18 extends from the outer periphery of chamber 14 to the inner periphery of tank 10, being disposed tangentially to the former and so positioned that its lower inner edge practically coincides with one of the sides of the opening at 19, and its inner surface faces toward said opening.

As the swirling body of fluid escapes the chamber 14 through the opening at 19, a portion of it is directed along the inner surface of baffle 18 toward the inner periphery of tank 10, while the remainder spreads directly into the immediate widening area of the tank 10, the whole encircling the inner chamber until it enters the confined area between the inner wall of tank 10 and the outer surface of baffle 18, where its velocity will be increased. In the meantime it rises slowly due to the continuing intake and eventually reaches the level of outlet 17ª through which it escapes, being carried off by outlet pipe 17. The course is indicated by arrows.

It will be noted that there is no direct route from the inlet to the outlet nor any short cut from the opening in chamber 14 to said outlet, which condition insures the complete travel of the entire flow throughout the course indicated and eliminates the presence of non-functioning or dead spaces within the tank.

In Fig. 4, I have shown a modification which provides for greater velocity as the flow leaves the inner chamber and as it enters the area of the outlet, by disposing the chamber 14 nearer to the side of tank 10, instead of having it concentric therewith as shown in Figs. 1 and 2. For certain purposes the arrangement shown in the modification may be preferred and prove to be of greater efficiency. The principle, however, is the same in both.

At the bottom of the tank pick up pipes 20 and valve 21 to control the same are provided in order that a collection of sediment may be washed out, without interfering with operation of the tank.

To prevent overflow from the tank in the event that the outlet pipe should become clogged, an automatic balanced float cut-off valve is provided for the inlet pipe 15. This cut-off valve is of any well known construction and forms no part of my present invention. As shown, 23 is the stem of the valve, 24 the float pot, 22 the valve connected to the latter, and 25 a ball crank lever the long arm of which is connected to another float (not shown) and the short arm to a rod 26 engaging the end of lever 22.

A settling tank such as has been described will be found useful as an auxiliary to filters, and in connection with processes which require elimination of the heavier solids from fluids of any kind. It is particularly well adapted for use in water softening systems, the agitation within the inner chamber serving to maintain the added agents in suspension and the substantially horizontal flow through the widened and contracted areas of the tank proper providing ideal conditions for clarification.

I claim:

1. A settling tank comprising an inner and an outer chamber having a communicating opening at the bottom, means to cause the water to travel around within the wall of the inner chamber from the top to the bottom, and means to cause the water to travel around within the wall of the outer chamber from the bottom to the top.

2. A settling tank, comprising an inner and an outer circular chamber communicating at the bottom, an inlet pipe at the top of the inner chamber so located as to give the incoming water a swirling motion, a baffle between the walls of said chambers so located as to give the water a circular motion as it rises in the outer chamber, and an outlet pipe at the top of the outer chamber.

3. A settling tank, comprising an inner and an outer circular chamber communicating through a lateral opening at the bottom of the wall of the inner chamber, an inlet pipe arranged to direct the water tangentially into the top of the inner chamber, and a baffle plate adjacent said opening and arranged to direct the water around the wall of the outer chamber towards the top thereof where it is drawn off.

4. A settling tank, comprising an inner and an outer chamber, a partition between the walls of said chambers on one side and extending substantially tangentially to the wall of the inner chamber, an inlet pipe at the top of the inner chamber arranged to deliver water thereinto tangentially, and an outlet from the top of the outer chamber, the wall of the inner chamber having an opening at its bottom adjacent one side of said partition.

5. A settling tank, comprising an inner and an outer chamber, a tangential inlet pipe at the top of said inlet chamber, a wall of the latter having an opening at one side near its bottom, an outlet from the top of the outer chamber, and a baffle plate extending from the wall of the outer chamber to the wall of the inner chamber adjacent one side of said opening.

6. A settling tank comprising wall portions forming an inlet chamber having an inlet at its top and an outlet chamber having an outlet at its upper portion, there being an opening in the wall of said inlet chamber affording communication with the outlet chamber at the bottom thereof, and a baffle plate extending intermediate the walls of said chambers between said opening and the outlet.

7. A settling tank, comprising an outer cylindrical wall, an inner cylindrical wall having an opening at one side near its bottom, a baffle plate between said walls arranged tangentially to the inner wall and adjacent one side of said opening, an inlet at the top of the tank to introduce the liquid to be clarified within the inner wall and near one side thereof, and an outlet pipe for the clarified water at the top of the outer wall.

8. A settling tank, walls forming two chambers communicating at the bottom through a lateral opening in the wall of the inner chamber, an inlet being provided at the top of the inner chamber and an outlet being provided at the upper portion of the outlet chamber, and a vertical plate joining the walls of the chambers intermediate of said opening and an outlet, and extending substantially the full depth of the tank, whereby the water is caused to travel in a spiral path towards the top of the outer chamber.

In witness whereof I have hereunto signed my name in the presence of two subscribing witnesses.

WALTER H. GREEN.

Witnesses:
JAMES G. SHAKMAN,
HINSDALE C. FORD.

Certificate of Correction.

It is hereby certified that in Letters Patent No. 1,417,516, granted May 30, 1922, upon the application of Walter H. Green, of Chicago, Illinois, for an improvement in "Settling Tanks," errors appear in the printed specification requiring correction as follows: Page 2, claim 8, line 98, after the word "tank" insert the word *comprising;* line 105, strike out the word "of", second occurrence, and line 106, for the word "an" read *the;* and that the said Letters Patent should be read with these corrections therein that the same may conform to the record of the case in the Patent Office.

Signed and sealed this 11th day of July, A. D., 1922.

[SEAL.]                           KARL FENNING,

*Acting Commissioner of Patents.*